US006479069B1

(12) United States Patent
Hamilton

(10) Patent No.: US 6,479,069 B1
(45) Date of Patent: Nov. 12, 2002

(54) NUTRITIONAL SUPPLEMENT FOR INCREASED ENERGY AND STAMINA

(75) Inventor: Nathan D. Hamilton, San Francisco, CA (US)

(73) Assignee: Juvenon, Inc., Orinda, CA (US)

( * ) Notice: Subject to any disclaimer, the term of this patent is extended or adjusted under 35 U.S.C. 154(b) by 0 days.

(21) Appl. No.: 09/658,361

(22) Filed: Sep. 8, 2000

Related U.S. Application Data

(60) Provisional application No. 60/156,028, filed on Sep. 23, 1999, and provisional application No. 60/223,465, filed on Aug. 7, 2000.

(51) Int. Cl.[7] .................... A61K 31/20; A61K 47/00
(52) U.S. Cl. .................... 424/439; 514/558; 514/560
(58) Field of Search .................... 444/439; 514/560, 514/558

(56) References Cited

U.S. PATENT DOCUMENTS

| | | | |
|---|---|---|---|
| 3,810,994 A | 5/1974 | Wiegand | 424/316 |
| 4,343,816 A | 8/1982 | Cavazza | 424/316 |
| 4,401,827 A | 8/1983 | de Witt | 560/1 |
| 4,599,232 A | 7/1986 | Bertelli | 424/94 |
| 4,687,782 A | 8/1987 | Brantman | 514/561 |
| 4,751,242 A * | 6/1988 | Calvani et al. | 514/554 |
| 4,839,159 A | 6/1989 | Winter | 424/59 |
| 4,859,698 A | 8/1989 | Cavazza et al. | 514/445 |
| 5,030,458 A | 7/1991 | Shug et al. | 426/2 |
| 5,030,657 A | 7/1991 | Burtle et al. | 514/556 |
| 5,089,269 A | 2/1992 | Noda et al. | 424/456 |
| 5,240,961 A | 8/1993 | Shug | 514/556 |
| 5,260,464 A | 11/1993 | Della Valle et al. | 554/80 |
| 5,292,538 A | 3/1994 | Paul et al. | 426/74 |
| 5,326,699 A | 7/1994 | Torishima et al. | 435/240.2 |
| 5,362,753 A | 11/1994 | Blum et al. | 514/556 |
| 5,391,550 A | 2/1995 | Carniglia et al. | 514/48 |
| 5,472,698 A | 12/1995 | Rawlings et al. | 424/401 |
| 5,504,072 A | 4/1996 | Schmidl et al. | 514/21 |
| 5,536,645 A | 7/1996 | Jay | 435/32 |
| 5,536,499 A | 7/1996 | Ghelfi et al. | 502/400 |
| 5,560,928 A | 10/1996 | DeFelice | 424/466 |
| 5,607,980 A | 3/1997 | McAtee et al. | 514/476 |
| 5,626,849 A * | 5/1997 | Hastings et al. | 424/195.1 |
| 5,504,072 A | 8/1997 | Schmidl et al. | 514/21 |
| 5,665,364 A * | 9/1997 | McAtee et al. | 424/401 |
| 5,709,868 A | 1/1998 | Perricone | 424/401 |
| 5,728,735 A * | 3/1998 | Ulrich et al. | 514/74 |
| 5,821,237 A | 10/1998 | Bisset et al. | 514/75 |
| 5,889,055 A | 3/1999 | Howard | 514/561 |
| 5,916,912 A | 6/1999 | Ames | 514/440 |
| 5,977,162 A | 11/1999 | Seidman | 514/440 |
| 6,048,886 A | 4/2000 | Neigut | 514/412 |
| 6,140,512 A | 10/2000 | Adger et al. | 549/39 |
| 6,261,575 B1 | 7/2001 | Hoppe et al. | 424/401 |
| 2001/0005719 A1 | 6/2001 | Von Borstel | 514/49 |

FOREIGN PATENT DOCUMENTS

| | | |
|---|---|---|
| FR | 2725896 | 4/1996 |
| JP | 11180851 | 7/1999 |
| WO | WO 98/57627 | 12/1998 |
| WO | WO 00/11968 | 3/2000 |

OTHER PUBLICATIONS

Jack Challem, Jul. 1996 issue of The Nutrition Reporter™ newsletter, "Alpha–Lipoic acid: Quite Possibly the "Universal" Antioxidant", pp. 1–2, See nutritionreporter./alpha–lipoic World Wide Web site.*
Smith et al., J. Appl Physiol (1998), 85(4), 1349–56.*
R.J. Branconnier et al., "Recall and recognition as diagnostic indices of malignant memory loss in senile dementia: a Bayesian analysis", *Exp aging Re*, vol. 8, No. 3–4, pp. 189–193(Fall–Winter 1982) (Abstract).
M. Saleman, "Brain tumors in elderly patients", *Am Fam Physician*, vol. 27, No. 4, pp. 137–143 (Apr. 1983) (Abstract).
J.L. Cummings et al., "Subcortial demetia. Review of an emerging concept"*Arch Neurol*, vol. 41, No. 8, pp. 874–879, (Aug. 1984) (Abstract).
D.W. Loring et al., Auditory evoked potentials in senescent forgetfulness, *Int J Neurosci*, vol. 24, No. 2, pp. 133–141 (Oct. 1984) (Abstract).
B.A. Campbell et al., "Animal models of infantile amnesia, benign senescent forgetfulness, and senile dementia", *Neurobehave Toxicol Teratorl*, vol 6, No. 6, pp. 467–471 (Nov. –Dec. 1984) (Abstract).
D. G. Milder et al., "Neoropathological findinfs in as case of coexistent progressive supsupranuclear palsy and Alzheimer's disease", *Clinical Exp Neurol*, vol. 20, pp. 181–187, (1984) (no month) (Abstract).
P. Langsjoen et al., "Response of patients in classes III and IV of cardiomyopathy to therapy in a blind and crossover trial with coenzyme Q10", *Proc. Natl., Acad. Sci.*, vol. 82, pp. 4240–4244, Jun. 1985.
Petrie, "Alzheimer's disease", *Compr Ther*, vol. 11, No. 7, pp. 38–43, (Jul. 1985) (Abstract).
W.H. Riege et al., "Brain glucose metabolism functions: age decrease factor scores" *J Gerontol*, vol. 40, No. 4, pp. 459–467, (Jul. 1985) (Abstract).

(List continued on next page.)

*Primary Examiner*—Sreeni Padmanabhan
*Assistant Examiner*—S. Jiang
(74) *Attorney, Agent, or Firm*—Sierra Patent Group, Ltd.; Barbara J. Luther

(57) ABSTRACT

Disclosed herein are compositions to meet the needs of individuals, including humans and pets. Nutritional beverages, powders to make the same, a pudding and a nutritional bar are disclosed whose compositions include the R-α-lipoic acid in the amount of 0.12 grams to 1.5 grams and L-carnitine in the amount of 0.12 grams to 3 grams in addition to the usual composition. Optionally, effective amounts of coenzyme Q and/or creatine also are added. These additional components fight age-related declines in mitochondrial function which result in less energy and other signs of aging.

12 Claims, No Drawings

OTHER PUBLICATIONS

C.E. Wright et al., "The flash and pattern VEP as a diagnostic indictaor of dementia", *Doc Ophthalmol.* vol. 62, No. 1, pp. 89–96, (Jan. 31, 1986) (Abstract).

C.M. Poser et al., "Benign encephalopathy of pregnancy. Preliminary clinical observations", *Acat Neuro. Scand.*Vol. 73, No. 1, pp. 39–43, (Jan. 1986) (Abstract).

J. V. Haxby, "Relations among age, visual memory, and resting cerebral metabolism in 40 healthy men", *Brain Cogn,*vol. 5, No. 4, pp. 412–427, (Oct. 1986) (Abstract).

C. Brayne et al., Normal aging, impaired cognitive function, and semile dementia of the Alzheimer's type: a continuum?, *Lancet.*vol. 1, No. 8597, pp. 1265–1267, (Jun. 4, 1988).

K.A. Bamford et al., "Does 'benign senescent forgetfulness'exist?", *Arch Gen Psychiatry*, vol. 45, No. 10, pp. 897–916. (Nov. 1988) (Abstract).

C.G. Gottfies, "Dementia: classification and aspects of treatment", *Psychopharmacol Ser.*vol. 5, pp. 187–195, (1988) (no month) (Abstract).

C. Derouesne, "Neuropsychological testing for evaluation of brain aging", *Ann Med Interne,*(Paris) 141 Suppl, vol. 1, pp. 27–30, (1990) (no month) (Abstract).

K. Elrod et al., "Correlation of the amnestic effects of nicotine antagonists with inhibition of regional brain acetycholine synthase in rats", *J. Pharmacol Exp Ther.*vol. 258, No. 2, pp. 403–409, (Aug. 1991) (Abstract).

W.P. Skelton III, M.D. et al., "Alzheimer's disease, Recognizing and treating a frustrating condition", *Postgrad Med-.*vol. 90, No. 4, pp. 33–44, 37–41, (Sep. 15, 1991).

D.K. Rush et al., "Memory modulation with peripherally acting cholinergic drugs", *Psychopharmacology,*(Berl), vol. 106, No. 3, pp. 375–382, (1992) (no month) (Abstract).

W.D. Heiss et al., "PET correlates of normal and impaired memory functions", *Cerbovase Brain Metab Rev.*vol. 4, No. 1, pp. 1–27, (Spring 1992) (Abstract).

C. LeBel et al., "Evaluation of the Probe 2', 7'–Dichlorofluorescin as an Indicator of Reactive Oxygen species Formation and Oxidative Stress", *Chem.Res. Toxicol*, pp. 227–231 (1992) (no month).

K.Adachi et al. "A Deletion of Mitochondrial DNA in Murine Doxorubicin–induced Cardiotoxicity", *Biochemical and Biophysial Research Comm.*, vol. 195, No. 2, pp. 945–951 (Sep. 1993).

P.M. Crasby et al., "Activation of the human hippocampal formation during auditory–verbal long–term memory function", *Neurosci Lett.*vol. 163, No. 2, pp. 185–188, (Dec. 12, 1993) (Abstract).

K.E. Sundqvist et al., "Metabolic effects of propionate, hexanoate and propionylcarnitine in normoxia, ischaemia and reperfusion. Does an anaplirotic substrate protect the ischaemic myocardium?", *Eur Heart J.* vol 15, No. 4, pp 561–570, (Apr. 1994) 9Abstract).

P.R. Rapp et al., "Memory systems in normal and pathological aging", *Curr Opin neurol.*vol 7, No. 4, pp.294–298, (Aug. 1994) (Abstract).

O.J. Heinonen et al., "Moderate carnitine depletion and long–chain fatty acid oxidation, Exercise capacity, and nitrogen balance in the rat", *Pediatr Res.,* vol. 36, No. 3, pp. 288–292, (Sep. 1994) (Abstract).

M.K. Shigenaga et al., "Oxidative damage and mitochondrial decay in aging", *Pro Natl Acad Sci.* (USA), vol. 91, pp. 10771–10778, (Nov. 1994).

Z. Guan et al., "Content and Fatty Acid Composition of Cardiolipin in the Brain of Patients with Alzheimer's Disease", *Neurochem Int.*, vol. 25, No. 3, pp. 295–300 (1994) (no month).

P.C. Fletcher et al., "Brain systems for encoding and retrieval of auditory–verbal memory. An in vivo study in humans", *Brain*, vol. 118, Part 2, pp. 401–416, (Apr. 1995) (Abstract).

F. Eustache et al., "Healthy aging, memory subsystems and regional cerebral oxygen consumption", *Neuropsychologia*, vol 33, No. 7, pp. 867–887, (Jul. 1995) (Abstract).

P.C. Fletcher et al., "The functional anatomy of memory", *Experientia,* vol. 51, No. 12, pp. 1197–1207, (Dec. 1995) (Abstract).

J. Jolles, et al., "Cognitive impairment in elderly people. Predisposing factors and implications for experimental drug studies", *Drugs Aging*, vol. 7, No. 6, pp. 459–479, (Dec. 1995) (Abstract).

L. Nyberg et al., "Age differences in episodic memeory, semantic memory, and priming: relationships to demographic intellectual, and biological factors", *J Gerontol BP Psychol Sci Soc*, vol 51, No. 4, pp. 234–240, (Jul. 1996) (Abstract).

E. Salmon, "Regional brain activity during working memory tasks", *Brain*, vol. 119, Part 5, pp. 1617–1625, (Oct. 1996) (Abstract).

T. Hagen et al., "Mitochondrial decay in hepatocytes form old rats: Membrane potential declines, heterogeneit and oxidants increase", *Proc. Natl. Acad. Sci, USA*, vol. 94, pp. 3064–3069 (Apr. 1997).

C. Sobreira, "Mitochondrial encephalomyopathy with coenzyme Q10 deficiency", *Neurology,* No. 48, pp. 1238–1243 (May 1997).

H. K. N'averi et al., "Skeletal mucle lactate accumulation and creatine phosphate depletion during heavy exercise in congestive heart failure, Cause of limited exercise capacity?", *Eur Heart J.* vol. 18, No. 12, pp. 1937–1945, (Dec. 1997) (Abstract).

P. Langsjoen et al., "Treatmane tof Hypertrophic Cardiomyopathy with coenzyme Q10", *Molec, Aspects Med.*, vol. 18, (Suppl.), pp. s145–s151, 1997 (no month).

R. Aejmelaeus et al., "Ubiquinol–10 and total peroxyl radical trappping caacity of LDL liproproteins during aging: the effects of Q–10 supplementation", *Molec. Aspects Med.*, vol. 18, (Supplement) pp. s113–s120 (1997) (no month) (abstract)

M. Beal et al, "Coenzyme Q10 attenuates the 1–methyl–4–phenyl–1,2,3 tetrahydropyridine (MPTP) induced loss of striatal dopamine and dopamimergic axons in aged mice", *Brain Research*, vol. 783, pp. 109–114 (Feb. 1998) (Abstract).

K.B. Beckman et al., "The Free Radical Theory of Aging Matures", *Physiological Reviews*, vol. 78, No. 2, pp. 547–580, (Apr. 1998).

K.B Lonnrot et al., "The effects of lifelong ubiquinone Q10 supplementation on the Q9 and Q10 tissue concentrations and life span of male rats and mice", *Biochemistry and Molecular Biology International*, vol. 44, No. 4, pp. 727–737 (Apr. 1998) (Abstract).

K. Lonnrot et al., "Control of arterial tone after long–term coenzyme Q10 supplementation in senescent rats", *British Jr. of Pharmacology*vol. 124, No. 7, pp. 1500–1506 (Aug. 1998) (Abstract).

B. Barbiroli et al., "Aspects of human bioenergetics as studied in vivo by magnetic resonance spectroscopy", *Biochimie*, vol. 80, No. 10, pp. 847–853 (Oct. 1998) (Abstract).

S. Bermon et al., "Effects of creatine monohydrate ingestion in sedentary and weight–trained older adults", *Acta Physio Scand*, vol. 164, No. 2, pp. 147–155 (Oct. 1998) (Abstract).

T. Kalaiselvi "Effect of L—carnitine on the status of lipid peroxidation and antioxidants in aging rats", *J. Nutr. Biochem.*, vol 9, pp. 575–581. Pct/ 1998.

S. Smith et al., "Creatine supplementation and age influence muscle metabolism during exercise", *J. Applied Physiol.*, vol. 85, No. 4, pp. 1349–1356 (Oct. 1998) (Abstract).

A. Linnane et al., "The universality of bioenergetic disease. Age–associated cellular bioenergetic degradation and amelioration therapy", *Ann N.Y. Acad. Sci.*, vol. 854, pp. 202–213 (Nov. 1998) (Abstract)

B.N. Ames, "Micronutrients prevent cancer and delay aging", *Toxicology Letters*, 102–103, pp. 5–18, (Dec. 28, 1998).

G. Lenaz et al., "Oxidative stress, antioxidant defenses and aging", *BioFactors*, vol. 8, No. 3–4, pp. 195–204 (1998) (no month) (Abstract).

J. Kaikkonin et al., "Determinants of plasma coenzyme Q10 in humans", *FEBS Letters*, vol 443, No. 2, pp. 163–166 (Jan. 25, 1999) (Abstract).

C. Saliou et al., "Antioxidants modulate acute solar ultraviolet radiation–induced NF–kappa–B activation in a human keratinocycte cell line", *Free Radical Biology and Medicine*, vol. 26(1–2), pp. 174–83 (Jan. 1999) (Abstract).

A. Pfefferbaum et al., "In vivo brain concentrations of N–acetyl compounds, creatine, and choline in Alzheimer's disease", *Arch. Gen. Psychiatry*, vol. 56, No. 2, pp. 185–192 (Feb. 1999) (Abstract).

A Prefferbaum et al., "In vivo spectroscopic quantification of the N–acetyl moiety, creatine, and choline from large volumes of brain gray and white matter: effects of normal aging", *Magnetic Reson. Med.*, vol. 41, No. 2, pp. 276–284, (Feb. 1999) (Abstract).

J. Keady et al., "The DIAL–log study f1: profiling the experience of people with dementia", *Br J Nurs*, vol. 8, No. 6, pp. 387–393. (Mar. 25–Apr. 7, 1999) (Abstract).

T. Blatt et al., "Modulation of oxidative stresses in human aging skin", *Zeitschrift Fur Gerontologie Und Geriatrie*, vol. 32, No. 2, pp. 83–88 (Apr. 1999) (Abstract).

J. Challem, "Toward a new definition of essential nutrients: is it now time for the third 'vitamin'paradigm?", *Medical Hypotheses*, vol. 52, No. 5, pp. 417–422 (May 1999) (Abstract).

D.L. Hoyert et al., "Mortality from Alzheimer's disease: an update", *Natl Vital Stat Rep*, vol 47, No. 20, pp. 1–8, (Jun. 30, 1999) (Abstract).

N. Schuff et al., "Age–related metabolite changes and volume loss in the hippocampus by magnetic resonance spectroscopy and imaging", *Neurobiology of Aging*, vol. 20, No. 3, pp. 279–285 (May –Jun. 1999) (Abstract).

K. Overvad et al., "Coenzyme Q10 in health and disease", *European Jr. of Clinical Nutrition*, vol. 53, No. 10, pp. 764–770 (Oct. 1999) (Abstract).

M. Tomasetti et al., "Coenzyme Q10 enrichment decrteases oxidative DNA damage in human lymphocytes"m *Free Radical Biology & Medicine*, vol. 27, No. 9–10, pp. 1027–1032 (Nov. 1999) (Abstract).

M. Turunen et al., "Blood concentration of coenzyme Q10 increases in rats when esterified forms are administered", *Jr. of Nutrition*, vol. 129, No. 12, pp. 2113–2118 (Dec. 1999) (Abstract).

T. Kagan, "Coenzyme Q10 Can in some circumstances block apoptosis, and this effect is mediated through mitochondria", *Ann N.Y. Acad. Sci.*, vol. 887, pp. 31–47 (1999) (no month) (Abstract).

A. Lass et al., "Mitochondrial coenzyme Q content and aging", *BioFactors*, vol. 9, No. 2–4, pp.1 199–205 (1999) (no month) (Abstract).

H, Pedersen et al., "High serum coenzyme Q10, positively correlated with age, selenium and cholesterol, in Inuit of Greenland. A pilot study", *BioFactors*, vol 9, pp. 319–323(1999) (no month).

J. Huertas et al., "Virgin olive oil and coenzyme Q10 protect heart mitochondria form peroxidative damage during aging", *BioFactors*, vol 9, No. 2–4, pp. 337–343 (1999) (no month) (Abstract).

J. Brooks, PhD. et al., "Assessment of Executive Function in Patients with Mild Traumatic Brain Injury", *The Journal of Trauma: Injury, Infection, and Critical Care*, vol 46, No. 1, pp. 159–163, (1999) (no month).

S. D. Gale et al., "MRI, Quantitative MRI, SPECT, and neuropaychological findings following carbon monoxide poisoning", *Brain Injury*, vol. 13, No. 4, pp. 229–243, (1999) (no month).

J. Jang et al., "Application of biological monitoring to the quantitative exposure assessment for neuropsychological effect by chronic exposure to organic solvents", *Int Arch Occup Environ Health*, vol 72, pp. 107–114, (1999) (no month).

F. Rosenfeldt et al., "Coenzyme Q10 improves the tolerance of the senescent myocardium to aerobic and ischemic stress: studies in rats and in human atrial tissue", *Biofactors*, vol. 9, No. 2–4, pp. 291–299, (1999) (no month) (Abstract).

E. S. Rawson et al., "Acute creatine supplementation in older men", *Int. J. Sports Med.*, vol. 21, No. 1, pp. 71–75 (Jan. 2000) (Abstract).

O. Pastoris et al., "The effects of aging on enzyme activities and metabolite concentrations in skeletal muscle from sedentary male and female subjects", *Experimental Gerontology*, vol. 35, No. 1, pp. 95–104 (Feb. 2000) (Abstract).

G. Ravaglia et al., "Effect of micronutrient status on natural killer cell immune function in healthy free–living subjects aged >90 y", *AM J. Clin, Nutr*, vol 71, No. 2, pp. 2113–2118, (Feb. 2000) (Abstract).

* cited by examiner

NUTRITIONAL SUPPLEMENT FOR INCREASED ENERGY AND STAMINA

This application claims the benefit of U.S. Provisional Application No. 60/156,028, filed Sep. 23, 1999, and U.S. Provisional Application No. 60/223,465, filed Aug. 7, 2000.

TECHNICAL FIELD

The present invention is generally directed to dietary supplements and nutritional beverages. More specifically, the present invention relates to the addition of the combination of lipoic acid and carnitine to these compositions.

BACKGROUND OF THE INVENTION

Liquid diet supplements or nutritional drinks have been used for years to provide needed calories, protein, vitamins and minerals to people too sick or frail to eat sufficient amounts of solid food. Now these products are being marketed as energy boosters to people who want to remain energetic, particularly those aged 50 and older. The oldest and by far the best selling nutritional drink is made by the Ross Products Division of Abbott Laboratories (Columbus, Ohio). For 1997, its sales exceeded $170 million, which does not even include the higher-calorie Ensure Plus® or the lower calorie Ensure Light® beverages. Another competitor for active older consumers include Sandoz Nutrition (Minneapolis, Minn.) which sells ReSource®, the official nutritional drink of the senior Professional Golf Association tour. Mead Johnson Nutritionals (Evansville, Ind.) also has been marketing its Boost® drink to seniors.

Nutritional drinks are sold in a variety of flavors and supply approximately the following:

Calories: 180–350

Total Fat: 0–13 grams

Sodium 130–220 mg

Sugars: 12–26 grams

Protein: 9–25 grams

Registered dietitians state that these nutritional drinks are better than a snack such as a bag of cheese curls and a soda. Although the nutritional drinks are being marketed as meal replacements, dietitians warn that the drinks are an inadequate substitute for three balanced meals. Each 8-ounce can or carton has about 20–25% of the Recommended Daily Allowance of an assortment of vitamins and minerals but lacks fiber and other nutrients found in nature.

These drinks were developed for a variety of conditions, including persons with increased nutritional needs (e.g., athletes and pregnant women), inactive geriatric patients, patients recovering from illness or surgery (who cannot otherwise attend to their needs), malnourished cancer patients. None have been specially formulated to meet the needs of active seniors and take into account the recent research on micronutrients.

Recent research has suggested that taking sufficient quantities of certain substances rejuvenates aged mitochondria, the failing powerhouses of cell metabolism. Numerous lines of evidence suggest that the organelles of cellular respiration, the mitochondria, degenerate with cellular aging (Shigenaga et al. 1994, PNAS 91, 10771). Unfortunately, the study of mitochondrial aging has been hampered because mitochondria isolated from older cells and host animals are fragile and heterogeneous. Hence the interpretation of any results is suspect as about half the mitochondria lyse during isolation. Recently a new method was developed for studying mitochondria in hepatocytes from old animals that avoids this problem (Hagen et al. 1997, PNAS 94, 3064–3069). Mitochondria from older animals are not only more fragile, but have about half the level of cardiolipin, a key lipid unique to mitochondria, without which they can not maintain a high membrane potential. Furthermore, Hagen et al. show that in hepatocytes from older animals, the mitochondria are lower in membrane potential and leak more toxic oxidants.

Carnitine and carnitine derivatives have been used as metabolites in animal husbandry and for human diet and therapy. U.S. Pat. No. 5,362,753 (Method of increasing the hatchability of eggs by feeding hens carnitine); U.S. Pat. No. 4,687,782 (Nutritional composition for enhancing skeletal muscle adaptation to exercise training); U.S. Pat. No. 5,030,458 (Method for preventing diet-induced carnitine deficiency in domesticated dogs and cats); U.S. Pat. No. 5,030,657 (L-carnitine supplemented catfish diet); U.S. Pat. No. 4,343,816 (Pharmaceutical composition comprising an acyl-carnitine, for treating peripheral vascular diseases); U.S. Pat. No. 5,560,928 (Nutritional and/or dietary composition and method of using the same); U.S. Pat. No. 5,504,072 (Enteral nutritional composition having balanced amino acid profile); U.S. Pat. No. 5,391,550 (Compositions of matter and methods for increasing intracellular ATP levels and physical performance levels and for increasing the rate of wound repair); U.S. Pat. No. 5,240,961 (Method of treating reduced insulin-like growth factor and bone loss associated with aging); etc. Similarly, mitochondrially active antioxidants including vitamins (especially C, E, B and D), glutathione, N-acetyl cysteine, lipoic acid, etc., have been used variously as human nutritional supplements and in dietary prophylaxis and therapy. For example, applications of lipoic acid have included U.S. Pat. No. 5,607,980 (Topical compositions having improved skin); U.S. Pat. No. 5,472,698 (Composition for enhancing lipid production in skin); U.S. Pat. No. 5,292,538 (Improved sustained energy and anabolic composition and method of making); U.S. Pat. No. 5,536,645 (Nutritive medium for the culture of microorganisms); U.S. Pat. No. 5,326,699 (Serum-free medium for culturing animal cells); etc.

The acceptance of age-associated cellular bioenergetic degradation is gaining acceptance as the reason that the current life expectancy is 80 years, but life potential is estimated at 120 years. Bioenergetic degradation may contribute to various diseases of the aged, including heart failure, degenerative brain disease, muscle and vascular diseases, as well as other syndromes. The authors also propose a redox therapy based on coenzyme Q10, as that has been demonstrated to improve heart functions of old rats and not significantly affect those function in young rats (Linnane A W, Kovalenki S and Gingold E B. Ann NY Acad Sci 854:202–13, 1998).

Coenzyme Q or ubiquinone plays a central role in the mitochondrial respiratory chain that captures energy from metabolism. It exists in mitochondria in the oxidized quinone form under aerobic conditions. In the reduced form ubiquinol, Q10 is an antioxidant. Q also is present in mitochondrial lipids. The structure of Q is very similar to those of vitamins K and E, which are characterized by a polyisoprenoid side chain. Coenzyme Q10 has ten polyisoprenoid side chains. Mitochondria need to maintain a large excess of Q, compared to other respiratory enzymes. Q is required to act on a mobile component of respiration that collects reducing equivalents from the more fixed complexes and passes them to other compounds.

Many conflicting reports have been published on the effectiveness of Q10 in various laboratory and clinical settings. Barbiroli et al reported that Q10 administration caused marked improvement in oxidative phosphorylation in both skeletal muscles and brains of patients with mitochondrial cytopathies due to enzyme defects (Biochimie 80(10): 847–53, 1998). On the other hand, Lass et al studied the Q10 and Q9 content in brain, heart, skeletal muscle and other organs but found a decrease in mitochondrial Q9 and Q10 only in aging skeletal muscle (Biofactors 9(2–4):199–205, 1999).

Life-long Q10 supplementation was studied in male rats and mice. Q10 did not prolong or shorten the lifespan of rats or mice. Plasma and liver levels were 2.6–8.4 times higher in the supplemented rats. Q10 levels in kidney, heart and brain were not affected by Q10 supplementation (Lonnrot K et al. Biochem Mol Biol Int 44(4):727–37, 1998).

To determine if Q10 has a neuroprotective effect, mice were first treated with Q10 or a control diet for four weeks. Then their striatal nerves were poisoned 1-Me-4-Ph-1,2,3, tetrahydropyridine (MPTP). The mice continued on their assigned diets for another week before sacrifice. Both groups had considerable damage; however, the Q10-treated mice had 37% higher dopamine and 62% more dense neurons, indicating a protective effect of Q10. (Beal MF et al. Brain Res 783(1):109–14, 1998.

Q10 also blocks the effects of doxorubicin, which stimulates mitochondrial oxidant production and a marked increase in mtDNA deletions in cardiac tissue (Adachi et al. Biochem Biophys Res Commun 195:945–51, 1993).

A group of healthy Finnish men and women aged 28–77 were tested for the total peroxyl radical trapping capacity of human plasma LDL phospholipids. There was an age related difference in men, but not women. Most of the decrease occurred before age 50, remaining low into the 70's. Supplementation with Q10 doubled the peroxyl radical trapping capacity and thus may decrease LDL oxidation, which contributes to atherosclerosis (Aejmelaeus R et al. Mol Aspects Med 18 Suppl:S113–20, 1997).

Creatine is present in muscular tissue and the heart. Small amounts are found in the blood but not in normal urine. Normally the liver and kidneys produce creatine. When creatine is metabolized, its end product is creatinine, which is excreted in the urine. Serum creatinine may increase with age. Muscle mass usually decreases with age, but it is unknown if it is entirely due to declining activity with age. Also, many older people do not eat as much meat, an important source of creatine. The greater part of creatine in muscle is combined with phosphoric acid as phosphocreatine. There it plays an important part in mitochondrial metabolism. In the mitochondria, creatine kinase isoenzymes transfer high-energy phosphate to creatine. Next, creatine phosphate is transported out of the mitochondria into the cell's environment where it is available to generate extramitochondrial ATP. Different isoenzymes of creatine kinase mediate transfer of high-energy phosphate to and from the various systems that utilize or generate it, e.g., muscle contraction and glucose metabolism.

Researchers administered creatine and have studied a number of different parameters including aging and muscle function. Acute supplementation (5 days) in men over 60 was found to have no effect in isometric strength and only small increases in isokinetic performance and body mass (Rawson E S, Clarkson P M Int. J. Sports Med 21(1):71–5, 2000). Another study reported results on older adults (67–80 years, 16 females, 16 males) who were randomly assigned to control-creatine, control-placebo, trained-creatine and trained-placebo groups for an 8-week test. Both groups of trained subjects had significant increases in 1- and 12-repetitions maxima, but no beneficial effect was observed for creatine supplementation (Bermon S et al. Acta Physiol Scand 164(2):147–55, 1998). On the other hand, when a different parameter directly related to muscle metabolism was measured, a positive effect was seen after 7 days. Groups of male and female 30-year-olds and 50-year-olds performed single-leg knee-extension exercises inside an MRI. At the start of the study, the older group had lower resting phosphocreatine (PCr) and lower mean initial PCr resynthesis rate. After creatine supplementation, the resting PCr increased 15% (P<0.05) in the young group and 30% (P<0.05) in the middle-aged group. In the middle-aged group, mean initial PCr resynthesis rate increased significantly (P<0.05), to a level comparable to that of the young group. The time to exhaustion was increased in both groups combined after creatine supplementation. Smith SA et al. concluded that creatine supplementation has a greater effect on PCr availability and resynthesis rate in middle-aged compared with younger persons (J Appl Physiol 85(4):1349–56, 1998).

Schuff N et al. analyzed age-related metabolite change and volume loss in the hippocampus by MRI (Neurobiol Aging 29(3):279–85, May-June 1999). They analyzed N-acetyl aspartate (NAA, a neuron marker), volume changes, and ratios of NAA/choline (Cho) and NAA/Cr (creatine). Volume decreased about 20% between 36 and 85 years, while NAA/Cho decreased by 24% and NAA/Cr decreased by 26%, all of which were significant. The Cho/Cr ratio remained stable. The volume loss correlated with neuronal marker loss and indicated loss of neurons. In contrast, Pfefferbaum A et al (Magn Reson Med 41(2):276–84, 1999) reported NAA, Cho and Cr signal densities for healthy groups of 15 young and 19 elderly persons. NAA was higher in gray than white matter but did not differ between young and old subjects, despite significant gray matter volume deficits in the older subjects. The available gray matter appeared to be intact in older healthy adults. Cr concentrations were much higher in gray than white matter and significantly higher in the older subjects. Cho concentration in gray matter was also significantly higher in older subjects. The findings in older subjects were confirmed in another study in which Pfefferbaum compared Alzheimer disease (AD) and normal aging (Arch Gen Psychiatry 56(2): 185–92, 1999). Both groups showed cortical gray matter volume deficits. Gray matter NAA was reduced only in the AD group, compared to older and younger subjects. Cho levels were higher in the AD group versus the normal older group and were higher than in the young group. Gray matter creatine, phosphocreatine and choline concentrations in patients with AD correlated with poorer performance on recognition memory tests.

What is needed is an improved nutritional beverage that truly is geared to the needs of active, not debilitated, seniors. A survey of nutritional beverage Web sites uncovered that none of the disclosed formulas provide carnitine or lipoic acid. Likewise, a survey of "energy" bars disclosed that none list these ingredients. Such a nutritional drink would also provide the latest in anti-aging compounds that have been shown to increase energy and stamina, with fewer calories.

SUMMARY OF INVENTION

It is an object of the present invention to improve the diet of individuals, preferably individuals with deficient mitochondrial metabolism. It is a further object to provide a combination of an effective amount of a suitable antioxidant and an effective amount of a carnitine in a wide variety of foods and food supplements. It is a further object of the present invention to improve the diet of not only humans but also pets such as dogs, cats, horses, fish and birds.

A preferred combination of the present invention includes carnitine in the amount of 0.12 grams to 3 grams. A preferred form of carnitine is acetyl-L-carnitine (ALCAR).

A preferred combination of the present invention includes the antioxidant as R-α-lipoic acid in the amount of about 0.12 grams to about 1.5 grams.

Optionally, coenzyme Q and/or creatine are added to the combination. Preferred are coenzyme Q10 in the amount of about 100 mg and creatine in the amount of 5 grams.

DETAILED DESCRIPTION

Many foods, including the popular "energy" bars and beverages, lack two important ingredients: carnitine and lipoic acid. These two constituents are essential to discourage aging and provide more energy to older individuals and others with unhealthy mitochondria. Recent research has shown precisely how these two compounds work to promote healthy mitochondria. which are the energy powerhouses of the cells. Mitochondria are responsible for the production of ATP and are present in relatively high numbers in essentially all cells of the body. The mitochondrial electron transport system consumes approximately 85% of the oxygen utilized by a cell. Cellular energy deficits caused by declines in mitochondrial function can impair normal cellular activities and compromise the cell's ability to adapt to various physiological stresses, a major factor in aging. Because of this high oxygen use, the mitochondria also have the highest production of oxidants.

Oxidants damage mitochondria in three important ways. Oxidants damage DNA, lipids and protein. The intra-mitochondrial DNA (mtDNA) have levels of oxidative damage which are at least 10-fold higher than those of nuclear DNA, which correlates with the 17-fold higher evolutionary mutation rate in mtDNA compared with nuclear DNA. mtDNA oxidation accumulates as a function of age, which has been shown in several species, including humans. This may lead to dysfunctional mitochondria. Mitochondrial protein damage is also age-related and may decrease energy production and increase oxidant production. Oxidative damage to mitochondrial lipids contributes to the decreasing fluidity of cell membranes with age. The lipid cardiolipin is a major component of the mitochondrial membrane and facilitates the activities of key mitochondrial inner membrane enzymes. The aged, damaged mitochondrial membrane cannot contain the oxidants nor can it maintain as high a polarity as the younger membrane.

Fatty acid oxidation is an important energy source for many tissues. The activity of carnitine-acetyl-carnitine exchange across the inner mitochondrial membrane is of great importance. The activity of this exchange reaction is decreased significantly with age, which may be due to a lower intra-mitochondrial pool of carnitine. L-carnitine or acetyl-L-carnitine has been shown to slow or reverse this age-related dysfunction. It also can reverse the age-related decrease in cardiolipin, age-associated decrease in mtDNA transcription, and decreased membrane potential. By itself, L-carnitine or acetyl-L-carnitine cannot correct the problem of excess oxidants. In fact, it was recently reported that carnitine supplementation increased oxidant production by 30% and decreased cell antioxidants markedly. Thus, ALCAR administration in older individuals may contribute to greater oxidative stress.

For the aged mitochondrial engines to run on all cylinders, both carnitine and lipoic acid are essential. Lipoic acid is an antioxidant. And R-α-lipoic acid is a mitochondrial enzyme that can help reverse the decline in metabolism seen with age. R-α-lipoic acid supplementation has been shown to 1) reverse the age-related decrease in oxygen consumption, 2) restore the age-related decline in mitochondrial membrane potential, 3) triple the ambulatory activity of aged rats, 4) significantly lower the age-related increase in oxidants, and 5) restore glutathione and ascorbic acid levels to youthful levels.

Clearly, both carnitine and lipoic acid contribute to restoration of age-related mitochondria function and metabolic activity in older individuals. This contributes to improvements in energy, general health, mental acuity, immune system function, and skin and hair appearance and muscle mass.

Carnitine is available in many forms and all those are included in the invention of the combination of carnitine and thioctic acid. Carnitine and carnitine derivatives have been used as metabolites in animal husbandry and for human diet and therapy. U.S. Pat. No. 5,362,753 (Method of increasing the hatchability of eggs by feeding hens carnitine); U.S. Pat. No. 4,687,782 (Nutritional composition for enhancing skeletal muscle adaptation to exercise training); U.S. Pat. No. 5,030,458 (Method for preventing diet-induced carnitine deficiency in domesticated dogs and cats); U.S. Pat, No. 5,030,657 (L-carnitine supplemented catfish diet); U.S. Pat. No. 4,343,816 (Pharmaceutical composition comprising an acyl-carnitine, for treating peripheral vascular diseases); U.S. Pat. No. 5,560,928 (Nutritional and/or dietary composition and method of using the same); U.S. Pat. No. 5,504,072 (Enteral nutritional composition having balanced amino acid profile); U.S. Pat. No. 5,391,550 (Compositions of matter and methods for increasing intracellular ATP levels and physical performance levels and for increasing the rate of wound repair); U.S. Pat. No. 5,240,961 (Method of treating reduced insulin-like growth factor and bone loss associated with aging); etc. Most preferably, the carnitine is acetyl-L-carnitine.

A daily dosage of carnitine is generally about 10 milligrams (mg)/day to about 8 grams/day (g/day). A preferred carnitine is acetyl-L-carnitine (or ALCAR). Preferably, the amount of carnitine in the composition is about 25 mg to about 3,000 mg (or about 0.025 g to about 3 g). More preferably, the amount of carnitine in the composition is about 40 mg to about 700 mg (or about 0.04 g to about 0.7 g). Most preferably, the amount of carnitine in the composition is at least about 50 mg (or about 0.05 g).

By lipoic acid or thioctic acid is meant a mitochondrially active antioxidant that physiologically comprises a metabolically reactive thiol group. Mitochondrially active antioxidants including vitamins (especially C, E, B and D), glutathione, N-acetyl cysteine (NAC), lipoic acid, their derivatives, etc., have been used variously as human nutritional supplements and in dietary prophylaxis and therapy. For example, applications of lipoic acid have included U.S. Pat. No. 5,607,980 (Topical compositions having improved skin); U.S. Pat. No. 5,472,698 (Composition for enhancing lipid production in skin); U.S. Pat. No. 5,292,538 (Improved sustained energy and anabolic composition and method of making); U.S. Pat. No. 5,536,645 (Nutritive medium for the culture of microorganisms); U.S. Pat. No. 5,326,699 (Serum-free medium for culturing animal cells); etc. Preferably, the compound is at least one of glutathione, N-acetyl cysteine and lipoic acid. Most preferably, the compound is the R-enantiomeric form of lipoic acid. Metabolites of lipoic acid have been found to have a longer half-life and also are suitable for supplementation.

A daily dosage of lipoic acid is generally about 10 mg/day to about 8 g/day. A preferred lipoic acid is R-α-lipoic acid. Preferably, the amount of lipoic acid in the composition is about 25 mg to about 1,500 mg (or about 0.025 g to about 1.5 g). More preferably, the amount of lipoic acid in the composition is about 40 mg to about 700 mg (or about 0.04 g to about 0.7 g. Most preferably, the amount of lipoic acid in the composition is at least about 50 mg (or about 0.05 g).

Q10 is an important supplement. In groups of males and females ranging from 90–106 years, the prevalence of inadequate Q10 status was 40% for women and 24% for men. In women, the decreased Q10 was associated with impaired natural killer cell effectiveness (p<0.05), indicating decreased ability to fight infections and quickly eliminate individual cancer cells as they first develop. Q10 also appears to block programmed cell death, or apoptosis, through its action in the mitochondria (Kagan T et al, Ann NY Acad Sci 887:31–47, 1999). Furthermore, Q10 in its reduced from of ubiquinol-10 that is normally present in the blood, appears to protect human lymphocytes from oxidative damage to DNA (Tomasetti et al, Free Radic Biol Med 27 (9-10):1027–32, November 1999). No important adverse effects have been reported from experiments using daily supplements of up to 200 mg Q10 for 6–12 months and 100 mg daily for up to 6 y. Overvad K et al. Eur J Clin Nutr 53(10):764–70, 1999.

Q10 also may contribute to anti-aging effect by protecting against atherosclerosis that also results from oxidative stress. Pedersen H S, et al. Biofactors 9(2–4): 319–23, 1999). Q10 also improves the tolerance of the senescent myocardium to aerobic and ischemic stress in human atrial tissue and rats. Q10 corrected the age-specific diminished recovery of function in older hearts so that older hearts recovered function at a similar rate to younger ones (Rosenfeldt F L et al. Biofactors 9(2–4): 291–9, 1999).

As for the supplemental dose of Q10, older Finnish men obtained benefit from 100 mg/day. A woman deficient in Q10 received 150 mg/day and rapidly improved (Sobriera et al., Neurology, 48:1283–43, 1997). Q10 has also been used at doses of about 200 mg/day to help improve heart function in persons with hypertrophic cardiomyopathy. Based on this information, a supplemental dosage of Q10in the composition is about 20 mg to about 250 mg. Preferably, the Q10 dose in the composition is about 100 mg.

Because creatine intake is often decreased in older individuals, creatine supplementation should be considered. Many athletes have taken doses of creatine up to 75 g/day for years without known adverse effects, aside from weight gain, often attributed to increased muscle mass. Creatine may be most beneficial when ingested with glucose, which tends to increase creatine absorption. Often athletes ingest loading doses of 20 g/day divided into four doses for 5 days to one week. Then they take a maintenance dose of 5 g/day. Benefit in one week in older individuals (ages 40–73) has also been seen from a 20 g/day dose, in the form of increased skeletal muscle strength and endurance. It has been reported that about 1.5 g/day to about 25 g/day are safe for a period of at least a year. A suitable dosage [range] of creatine for the composition is about 0.5 g to about 25 g, preferably about 1 g to about 10 g, and most preferably about 5 g. Creatine is available as a salt, monohydrate, phosphate and citrate.

In addition to the compositions mentioned above and the examples given below, breakfast products would also benefit from the addition of a carnitine and a form of thioctic acid and include and are not limited to breakfast cereal (Total®, etc.), breakfast bars, Poptart® pastry, and quick breakfasts in a bun or taco (e.g., McDonald® Egg McMuffin®). The carnitine and thioctic acid can be added to bulk powders or powder packets, for example, in the following compositions: orange juice (e.g., Tang®), coffee creamer (e.g., Cremora®), powdered milk, powdered milk shakes/smoothies (e.g., MetaRX), butter-flavored powdered, sweetener powders (e.g., Nutrasweet®), and spice and herb mixes. The combination of carnitine and thioctic acid can be mixed with any cooked or uncooked food.

Premade drinks which would benefit from the inclusion of carnitine, thioctic acid, coenzyme Q and creatine include but are not limited to pre-made smoothies, additives to drinks like Jamba Juice® and Starbucks®, sports drinks such as Gatorade®, diet drinks such as Weight Watchers® and Slim Fast®, herbal drinks such as SoBe® (with St. John's Wort and other popular herbs). The formulations with carnitine, thioctic acid, coenzyme Q and creatine also can include any fortified foods or meals replacement foods.

The combination of carnitine, thioctic acid, coenzyme Q and creatine is provided in pet formulations, dried or canned or as a supplement for addition thereto. Animals expected to benefit from the composition include but are not limited to dogs, cats, horses, birds and fish. The formulations and/or content of these products are on the product label or are otherwise publicly available.

Additional nutrients are important in older individuals, including calcium, vitamin D, Vitamins B12, folic acid, B6, niacin, C or E, iron and zinc. Many of these nutrients have been found to be deficient in the diets of elders and should be appropriately supplemented in nutritional beverages and bars.

A preferred formulation provides lipoic acid and carnitine, optionally in combination with coenzyme Q10 and/or creatine, in a timed release formulation to provide a steady supply of the nutrients to the mitochondria which work 24 hours a day. One method of accomplishing timed release is chemically combining the micronutrient(s) with other molecules, which generally slows the process of making the micronutrient(s) available. Also the use of different salts of the micronutrients with different dissolution rates provides for the desired gradual release of each micronutrient.

Besides these methods, two other basic systems are used to control chemical release: coating a core comprising the micronutrient(s) and excipients (coated system) and incorporating the micronutrient(s) into a matrix (matrix system). Coated systems involve the preparation of product-loaded cores and coating the cores with release rate-retarding materials. Product-loaded cores can be formulated as microspheres, granules, pellets or core tablets. There are many known core preparation methods, including, but not limited to, 1) producing granules by top spray fluidized bed granulation, or by solution/suspension/powdering layering by Wurster coating, 2) producing spherical granules or pellets by extrusion-spheronization, rotary processing, and melt pelletization; 3) producing core tablets by compression and coating with a release rate-retarding material; 4) producing microspheres by emulsification and spray-drying.

Matrix systems embed the micronutrient in a slowly disintegrating or non-disintegrating matrix. Rate of release is controlled by the erosion of the matrix and/or by the diffusion of the micronutrient(s) through the matrix. In general, the active product substance, excipients and the release rate-retarding materials are mixed and then processed into matrix pellets or tablets. Matrix pellets can be formed by granulation, spheronization using cellulosic materials, or by melt pelletization using release retardant materials, while matrix tablets are prepared by compression in a tablet press. An example of a cellulosic material is hydroxypropylmethylcellulose as the release rate retarding material.

Coated or matrix pellets can be filled into capsules or compression tabletted. The rate of release can be further modified by blending coated or matrix pellets with different release rates of the same product to obtain the desired product release profile. Pellets containing any of lipoic acid, carnitine, coenzyme Q10 or creatine can be blended to form a combination product.

Convenient assays for the requisite bioactivities are described above or in the references cited herein. For example, cardiolipin content is readily assayed as referenced in Guan, Z. Z., Soderberg, M., Sindelar, P., and Edlund, C. Content and Fatty Acid Composition of Cardiolipin in the Brain of Patients with Alzheimer's Disease. Neurochem. Int. 25: 295–300, 1994 and oxidant production (DCFH) may be assayed as described by LeBel, C. P., Ischiropoulos, H., and Bondy, S. C. Evaluation of the Probe 2',7'-Dichlorofluorescin as an Indicator of Reactive Oxygen Species Formation and Oxidative Stress. Chem. Res. Toxicol. 5: 227–231, 1992. Assays for parameters of aging such as host activity and behavior such as grooming, sexual activity, dominance, etc., coat condition, wound repair, including molecular lesions, muscle strength and tone, kidney appearance and function, etc. are similarly well known in the art.

EXAMPLE 1

Boost® with fiber nutritional beverage (Mead Johnson Nutritionals) has the following aspects and ingredients. Amounts are per 8 fl. oz. container, which is planned to provide ¼ of the daily requirements.

| | |
|---|---|
| Calories | 250 |
| Calories from fat | 70 |
| Protein, g | 11 |
| Fat, g | 8 |
| Saturated fat, g | 1.5 |
| Carbohydrate, g | 33 |
| Dietary Fiber, g | 3 |
| Sugars, g | 16 |
| Water, g | 200 |
| Vitamin A, IU | 830 |
| Vitamin D, IU | 100 |
| Vitamin E, IU | 5 |
| Vitamin K, µg | 23 |
| Vitamin C, mg | 30 |
| Folic Acid, µg | 100 |
| Thiamin, mg | 0.37 |
| Riboflavin, mg | 0.43 |
| Niacin, mg | 5 |
| Vitamin B6, mg | 0.5 |
| Vitamin B12, µg | 1.5 |
| Biotin, µg | 75 |
| Pantothenic Acid, mg | 2.5 |
| Calcium, mg | 200 |
| Phosphorus, mg | 167 |
| Iodine, µg | 25 |
| Iron, mg | 3 |
| Magnesium, mg | 67 |
| Copper, mg | 0.33 |
| Zinc, mg | 3.3 |
| Manganese, mg | 0.42 |
| Chloride, mg | 330 |
| Potassium, mg | 330 |
| Sodium, mg | 170 |
| And Chocolate or Vanilla flavor | |

To create nutritional value for active elders, we add at least 0.12 grams of R-α-lipoic acid and at least 0.12 grams of L-carnitine. Optionally, Q10 is added in the amount of about 100 mg, and creatine in the amount of about 2 grams. Furthermore, to take into account the different nutritional needs of older persons, we increase calcium to half the RDA of 1200 mg, magnesium to 100 mg, and vitamin D to 150 mg.

EXAMPLE 2

Boost® High Protein Powder (Mead Johnson Nutritionals) is a high-protein, low-fat nutritional powder that can be mixed with skim milk or water. 54g of the powder is to be mixed with 8fl. oz. of water, and is said to provide at least 25% of the US RDA of most essential vitamins and minerals in 200 calories. It has virtually no fat. Mixed with skim milk, the mixture provides 290 calories and about 33% of the US RDA of most essential vitamins and minerals.

| | |
|---|---|
| Protein, g | 13 |
| Carbohydrate, g | 36 |
| Sugars, g | 35 |
| Water, g | 240 |
| Vitamin A, IU | 1290 |
| Vitamin D, IU | 33 |
| Vitamin E, IU | 10 |
| Vitamin C, mg | 20 |
| Folic Acid, µg | 133 |
| Thiamin, mg | 0.4 |
| Riboflavin, mg | 0.2 |
| Niacin, mg | 6.8 |
| Vitamin B6, mg | 0.55 |
| Vitamin B12, µg | 1 |
| Biotin, µg | 93 |
| Pantothenic Acid, mg | 2.7 |
| Calcium, mg | 290 |
| Phosphorus, mg | 250 |
| Iodine, µg | 40 |
| Iron, mg | 6 |
| Magnesium, mg | 105 |
| Copper, mg | 0.7 |
| Zinc, mg | 4 |
| Manganese, mg | 1 |
| Chloride, mg | 220 |
| Potassium, mg | 560 |
| Sodium, mg | 189 |

To properly supply nutrients to active elders, we supplement the above formula with at least 0.12 grams of R-α-lipoic acid and at least 0.12 grams of L-carnitine. Optionally, Q10 is added in the amount of about 100 mg, and creatine in the amount of about 2 grams. Furthermore, to take into account the different nutritional needs of older persons, it would be preferable to increase calcium to 600 mg (half the RDA of 1200 mg), and Vitamin D to 150 mg. These additions would increase powder weight per 8 ounces water to about 56 g.

EXAMPLE 3

Boost® Pudding (Mead Johnson) says its intended use is in geriatric patients, malnourished cancer patients and persons desiring weight control. The current formulation provides 240 calories in 5 ounces, low sodium and cholesterol and 15–20% of the US RDA requirements for most vitamins and minerals. Tailoring the following formulation for use in active elders would be highly beneficial.

| | |
|---|---|
| Protein, g | 7 |
| Fat, g | 9 |
| Saturated Fat, g | 1.5 |
| Sugars, g | 27 |
| Water, g | 92 |
| Vitamin A, IU | 750 |
| Vitamin D, IU | 60 |
| Vitamin E, IU | 4.5 |
| Vitamin C, mg | 9 |
| Folic Acid, μg | 60 |
| Thiamin, mg | 0.23 |
| Riboflavin, mg | 0.26 |
| Niacin, mg | 3 |
| Vitamin B6, μg | 300 |
| Vitamin B12, μg | 0.9 |
| Biotin, μg | 45 |
| Pantothenic Acid, mg | 1.5 |
| Calcium, mg | 220 |
| Phosphorus, mg | 220 |
| Iodine, μg | 23 |
| Iron, mg | 2.7 |
| Magnesium, mg | 60 |
| Copper, mg | 0.3 |
| Zinc, mg | 2.3 |
| Chloride, mg | 200 |
| Potassium, mg | 320 |
| Sodium, mg | 120 |

To formulate this product to help active seniors, the following changes are made: we supplement the above formula with at least 0.12 grams of R-α-lipoic acid and at least 0.12 grams of L-carnitine. Optionally, Q10 is added in the amount of about 100 mg, and creatine in the amount of about 2 grams. Furthermore, to take into account the different nutritional needs and ingestion patterns of older persons, it would be preferable to increase calcium to 600 mg (half the RDA of 1200 mg), and Vitamin D to 150 mg.

EXAMPLE 4

A nutritional bar that has been developed for women (Luna™, from Clif Bar, Inc., Berkeley, Calif.) has been formulated to meet the needs of active women, with only 180 calories, and has the following nutrients levels:

| | |
|---|---|
| Total Fat, g | 4 |
| Saturated Fat, g | 3 |
| Sodium, mg | 50 |
| Potassium, mg | 90 |
| Total Carbohydrate, g | 26 |
| Dietary Fiber, g | 1 |
| Sugars, g | 15 |
| Other Carbs, g | 10 |
| Protein, g | 10 |
| Vitamin A, % | 25 |
| Vitamin C, % | 100 |
| Calcium, % | 35 |
| Iron, % | 35 |
| Vitamin K, % | 100 |
| Thiamin, % | 100 |
| Riboflavin, % | 100 |
| Niacin, % | 100 |
| Vitamin B6, % | 100 |
| Folic Acid, % | 100 |
| Vitamin B12, % | 100 |
| Biotin, % | 100 |
| Pantothenic Acid, % | 100 |
| Phosphorus, % | 35 |
| Iodine, % | 35 |
| Zinc, % | 35 |
| Selenium, % | 35 |
| Copper, % | 35 |
| Manganese, % | 35 |
| Chromium, % | 35 |
| Molybdenum, % | 35 |

To convert this product to support the metabolism of active seniors, the following formulation additions are made: at least 0.12 grams of R-α-lipoic acid and at least 0.12 grams of L-carnitine. Optionally, Q10 is added in the amount of about 100 mg, and creatine in the amount of about 2 grams. Furthermore, to take into account the different nutritional needs and ingestion patterns of older persons, nutrient increases include, but are not limited to, calcium to 600 mg (half the RDA of 1200 mg), and Vitamin D to 150 mg.

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An approximately 75-gram food bar having a composition consisting essentially of:
   a) R-α-lipoic acid in the amount of about 0.025 grams to about 1.5 grams;
   b) acetyl-L-carnitine in the amount of about 0.025 grams to about 3 grams;
   c) coenzyme Q10 in the amount of about 100 mg;
   d) creatine in the amount of about 2 grams to about 5 grams;
   e) carbohydrate sufficient to provide 100 calories;
   f) total fat in an amount sufficient to provide 50 calories; and
   g) flavors.

2. The food bar of claim 1, wherein the aceryl-L-carnitine is in the amount of at least about 0.12 grams.

3. The food bar of claim 1, wherein the R-α-lipoic acid is in the amount of at least about 0.12 grams.

4. A nutritional beverage having a composition consisting essentially of:
   a) R-α-lipoic acid in the amount of about 0.025 grams to about 1.5 grams;
   b) acetyl-L-carnitine in the amount of about 0.025 grams to about 3 grams;
   c) coenzyme Q10 in tie amount of about 100 mg;
   d) creatine in the amount of about 2 grams to about 5 grams;
   e) carbohydrate sufficient to provide 100 calories;
   f) total fat in an amount sufficient to provide 50 calories;
   g) flavors; and
   h) sufficient water to solubilize ingredients a) through g).

5. The nutritional beverage of claim 4, wherein the acetyl-L-carnitine is in the amount of at least about 0.12 grams.

6. The nutritional beverage of claim 4, wherein the R-α-lipoic acid is in the amount of at least about 0.12 grams.

7. A dried beverage mix having a composition consisting essentially of:

a) R-α-lipoic acid in the amount of about 0.025 grams to about 1.5 grams;
b) acetyl-L-carnitine in the amount of about 0.025 grams to about 3 grams;
c) coenzyme Q10 in the amount of about 100 mg;
d) creatine in the amount of about 2 grams to about 5 grams;
e) carbohydrate sufficient to provide 100 calories;
f) total fat in an amount sufficient to provide 50 calories; and
g) flavors.

8. The beverage mix of claim 7, wherein the acetyl-L-carnitine is in the amount of at least about 0.12 grams.

9. The beverage mix of claim 7, wherein the R-α-lipoic acid is in the amount of at least about 0.12 grams.

10. A pudding having a composition consisting essentially of:

a) R-α-lipoic acid in the amount of about 0.025 grams to about 1.5 grams;
b) acetyl-L-carnitine in the amount of about 0.025 grams to about 3 grams;
c) coenzyme Q10 in the amount of about 100 mg;
d) creatine in the amount of about 2 grams to about 5 grams;
e) carbohydrate sufficient to provide 100 calories;
f) total fat in an amount sufficient to provide 50 calories; and
g) flavors.

11. The pudding of claim 10, wherein the acetyl-L-carnitine is in the amount of at least about 0.12 grams.

12. The pudding of claim 10, wherein the R-α-lipoic acid is in the amount of at least about 0.12 grams.

* * * * *